UNITED STATES PATENT OFFICE.

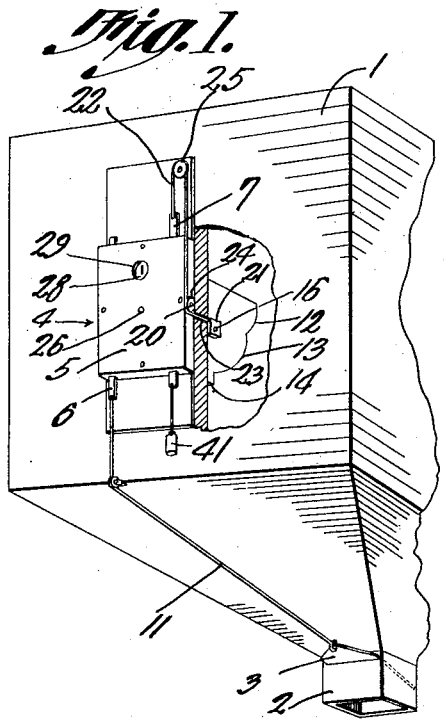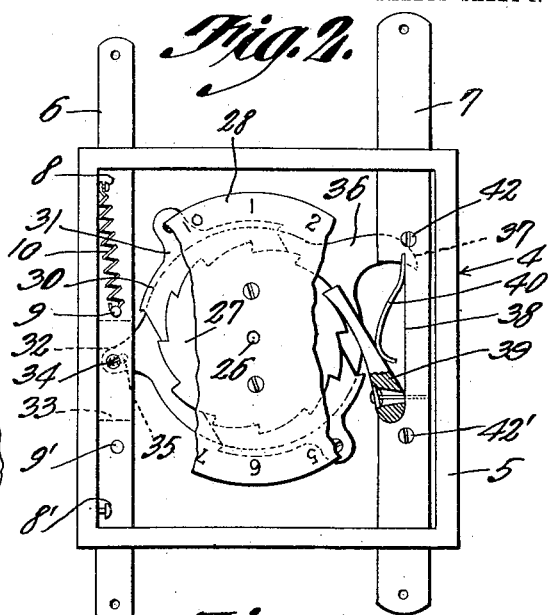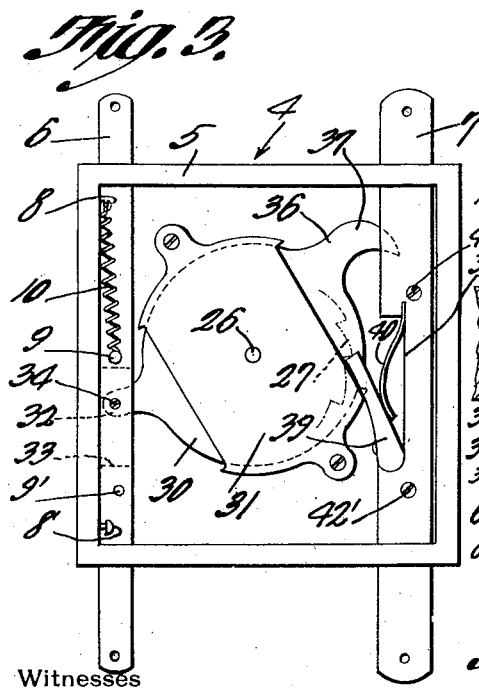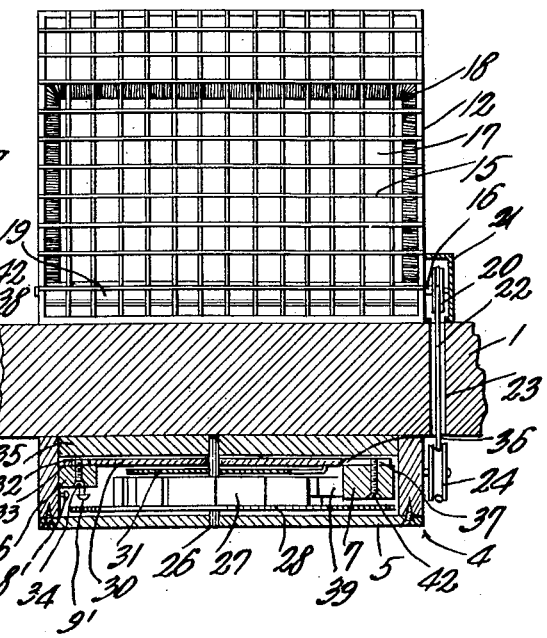

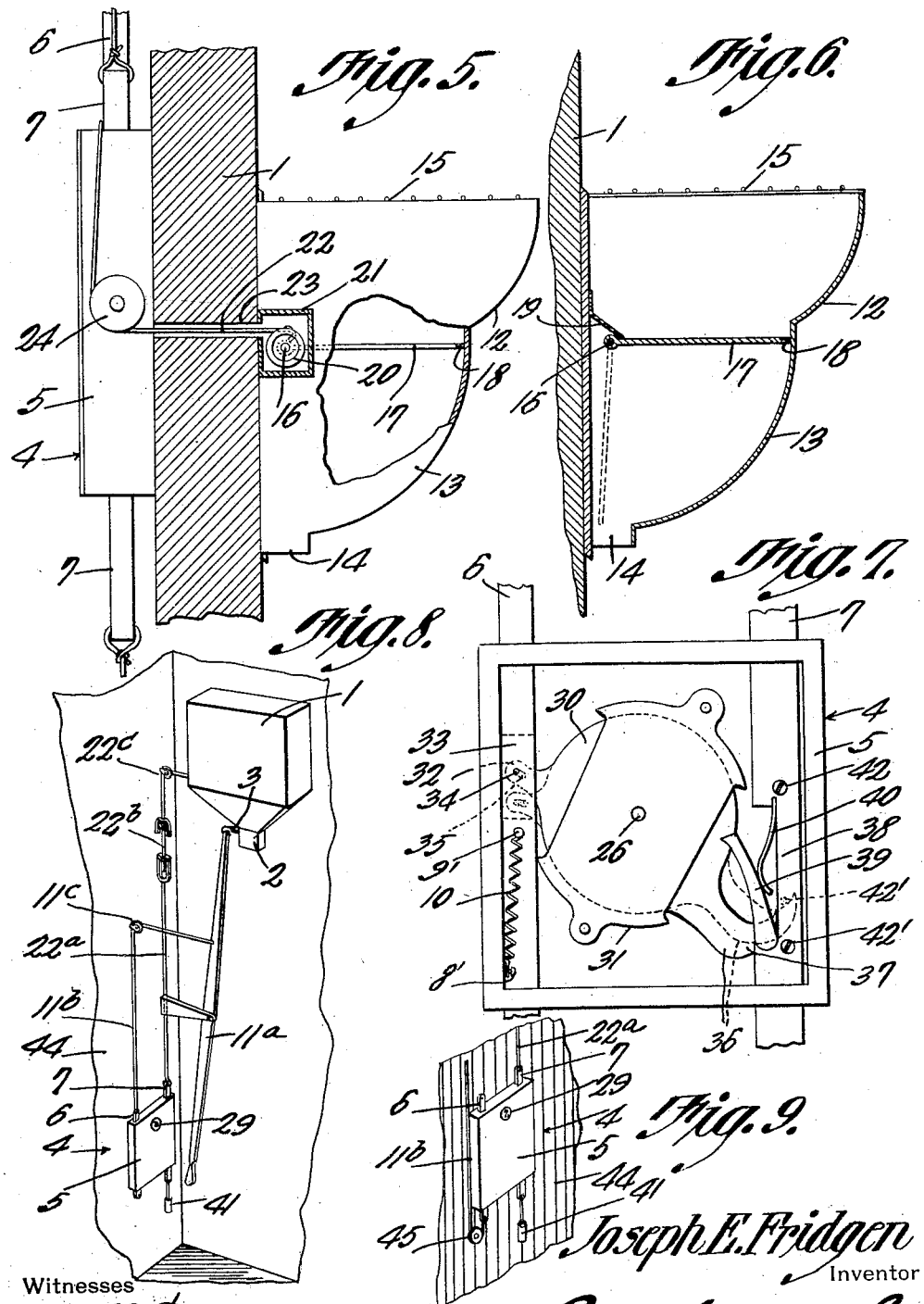

JOSEPH E. FRIDGEN, OF GLEN ULLIN, NORTH DAKOTA.

HOPPER-TALLY.

1,102,258. Specification of Letters Patent. Patented July 7, 1914.

Application filed June 28, 1913. Serial No. 776,389.

*To all whom it may concern:*

Be it known that I, JOSEPH E. FRIDGEN, a citizen of the United States, residing at Glen Ullin, in the county of Morton and State of North Dakota, have invented a new and useful Hopper-Tally, of which the following is a specification.

The present invention appertains generally to registers or tallies, and aims to provide a novel and improved device of that character applicable to grain hoppers or the like, for registering the number of drafts drawn therefrom in filling a car, or the like.

It is the object of the present invention to provide a device of the nature indicated which will automatically register the succeeding drafts of grain or other material drawn from the hopper in order to dispense with errors due to mental computation of the drafts, as is prevailing practice.

Another object of the present invention is to provide a register or tally of the character indicated which shall register the drafts of grain or the like, as they are run into the hopper, and which shall be so operable as to return to normal or initial position after the slide or valve of the hopper is again closed subsequent to the drawing off of the grain or other material from the hopper.

A further object of the present invention is to provide means for constraining the register or tally from returning to normal or initial position, until the slide or valve of the hopper is closed, thereby assuring the emptying of the hopper prior to the return of the register or tally mechanism to normal or initial position.

The present invention also has for its object to provide a register or tally which shall be applicable to various hoppers, or similar devices, for measuring and discharging grain or other materials.

The invention also contemplates the provision of novel means for returning the register or tally mechanism to normal or initial position after the slide or valve of the hopper is closed, and when the hopper is being filled with a succeeding draft of grain or other material.

It is also within the scope of the present invention to provide a device of the character indicated, which shall be comparatively simple, compact and inexpensive in construction, as well as serviceable, convenient and efficient in its use.

With the foregoing and other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a fragmental perspective of a hopper illustrating the improved register or tally applied thereto. Fig. 2 is a front elevation of the improved device, parts being broken away, and the cover or face plate being removed. Fig. 3 is a view similar to Fig. 2, parts being removed, and the several parts being in different positions. Fig. 4 is a horizontal section of the device. Fig. 5 is a side elevation of the device, parts being broken away. Fig. 6 is a sectional view of the pocket. Fig. 7 is a front view of the device, parts being removed, and parts being reversed. Fig. 8 is a perspective view, somewhat diagrammatical in nature, illustrating a second use of the improved register or tally. Fig. 9 is a fragmental perspective illustrating another use of the device.

In the drawings, an ordinary hopper has been designated by the numeral 1, the same embodying the lower spout or delivery chute 2 provided with a slide or valve 3. This hopper may be of any suitable capacity, it being the practice at the present day, to fill the hopper with a suitable quantity of grain or other material and then to discharge the draft of grain into the car or other receptacle for shipment, the several drafts being chalked up by the operator. It not infrequently happens that the operator will become confused in chalking up the drafts, or will either forget to chalk up one or more drafts, so that numerous errors result from this prevailing practice. This disadvantage has been overcome by the provision of the present mechanism, which automatically registers the drafts. In other words, the present mechanism serves to register the number of times that the hopper is filled, without relying on the memory or labor of the operator.

In carrying out the present invention, there is provided an improved register or tally, indicated generally by the numeral 4, and embodying a suitable rectangular case or frame 5. Suitable plungers 6 and 7 are slidable through the top and bottom of the case 5 adjoining the respective sides, the upper and lower ends of the plungers 6 and 7 protruding beyond the top and bottom or ends of the case.

The plunger 6 is spring actuated in the proper direction, according to the use of the register or tally. Thus, headed pins or studs 8 and 8' are secured to the inner face of the respective side of the case adjoining the top and bottom thereof, and similar pins or studs 9 and 9' are secured to the forward face of the plunger 6 adjoining the respective pins 8 and 8'. A coiled wire spring 10 is engageable with the respective pairs of pins 8—9 and 8'—9' to either create an upward or a downward tension on the plunger 6. As illustrated in Fig. 2, the terminals of the springs 10 are hooked and engaged with the respective pins 8 and 9 to yieldingly slide the plunger 6 upward.

The plunger 6 is operatively connected to the slide or valve 3 of the hopper, and to this end, the cord or flexible element 11 is attached at one end to the slide or valve 3 and is attached at its other end, as illustrated in Fig. 1, to the lower end of the plunger 6. This connection of the valve 3 and the plunger 6 is employed when the case 5 is secured to one side of the hopper 1, as illustrated in Fig. 1, although it is to be understood that the connection between the valve and plunger 6 may be altered according to the use of the register or tally as will hereinafter more fully appear. It is evident that when the slide or valve is slid to closed position, the plunger 6 will be slid downwardly, against the tension of the spring 10, through the medium of the cord 11, the frictional hold of the slide or valve 3 preventing the spring 10 from ordinarily raising the plunger. The tension of the spring 10 is merely sufficient to raise the plunger 6 when the slide or valve 3 is opened.

The plunger 7 is designed to be raised or elevated when the hopper is filled with grain or the like, and to this end there is employed a suitable pocket 12 secured to the inner face of one side wall of the hopper 1, preferably that side to which the case 5 is attached. The pocket 12 is provided with segmental or curved bottom portion 13 terminating in the lower opening 14 through which the contents of the pocket may be discharged. The upper end or mouth of the pocket 12 is preferably provided with a guard 15 in the form of a screen, to prevent the entrance of large objects into the pocket, which would be liable to clog the same. The guard 15, however, permits of the ready entrance of grain, or the like, into the pocket. A transverse shaft 16 is journaled through the sides of the pocket 12, the back of the pocket being attached to the respective wall of the hopper 1, and a wing 17 is carried by the shaft 16, within the pocket. The side and free edges of the wing or valve 17 are adapted to work adjoining the respective portions or walls of the pocket, the free edge of the wing 17 working along the curved bottom portion 13 of the pocket to and from the opening 14. The side and free edges of the wing or valve 17 are preferably provided with brushes 18 to close the gaps between the wing and respective walls of the pocket, whereby the grain is prevented from leaking past the wing or valve 17, unless the valve is swung downwardly against the back of the pocket to permit the grain to be discharged through the lower opening 14 of the pocket. An apron 19 is secured to the back of the pocket and overhangs the shaft 16, so as to shield the same, and in order to prevent the grain from passing downwardly between the back of the pocket and the shaft 16. The free portion of the apron 19 terminates approximately in the horizontal plane of the shaft 16, in order that when the wing or valve 17 is swung upwardly to a horizontal position, as seen in Figs. 5 and 6, the same will strike the apron 19 to prevent further upward movement of the wing or valve. The upward movement of the wing or valve 17 is thus limited, in order that when the valve 17 is raised, the grain which enters the pocket will settle properly thereon.

On one protruding end of the shaft 16 is keyed or secured a small drum or spool 20 to which is secured a cable or cord 22, the said cable being adapted to be wound upon the spool 20 when the valve 17 is depressed or swung downwardly. Conversely, when the cord 22 is drawn outwardly, the same in unwinding from the spool 20 is designed to raise the valve 17. The spool 20 is protected by a covering or case 21 in order to prevent the grain or contents of the hopper from interfering with the operation of the spool 20 and the cord 22. The cord 22 passes through an aperture 23 provided in the wall of the hopper 1 and is trained upwardly over a pulley or guide 24 carried by the respective side of the case 5. The cord 22 passes upwardly from the pulley 24 over a pulley or guide 25 carried by the hopper above the plunger 7, the cord 22 being trained over the pulley 25 and being attached to the upper end of the said plunger. It is thus manifest that when the valve 17 is depressed due to the weight of the grain thereon, the plunger 7 will be raised, and conversely, when the plunger 7 is depressed, the valve 17 will be raised.

Returning to the register or tally *per se*, the same embodies a shaft 26 terminally secured to the central portions of the front and back of the case 5. A ratchet wheel 27 is rotatably mounted upon the shaft 26 adjoining the front or face plate of the case, and a suitable dial 28 is secured to the front face of the ratchet wheel 27. The dial 28 is provided with suitable indicia which are made to appear through an opening or aperture 29 provided in the front or face plate of the case 5 at any suitable point, so that as the dial or disk 28 is rotated, the succeeding indicia will be exposed through the opening 29 in order that the observer may know the number of drafts drawn from or delivered into the hopper.

A detent or locking disk 30 is mounted loosely on the shaft 26 adjoining the back of the case, an arbor 31 being terminally attached to the back of the case and extending over the front face of the disk 30. The shaft 26 passes loosely through the intermediate or central portion of the arbor. The disk 30 is provided at one side with an ear 32 fitting within a notch 33 provided in the rear face of the plunger 6, a screw or pin 34 being engaged through the plunger 6 and projecting within the notch 33 and engaging through an elongated aperture or slot 35 provided in the ear 32. Thus, the reciprocation of the plunger 6 is adapted to impart an oscillatory movement to the disk 30. The said disk is provided at its other side with a projection 36 terminating in a bill 37, the projection and its bill forming a dog or pawl for the purpose which will hereinafter appear.

The plunger 7 is provided with a recess or cutaway portion 38, at its inner edge, and a pawl or dog 39 is pivoted at its lower end within the lower end of the recess 38, the tip or free end of the pawl or dog 39 coöperating with the ratchet wheel 27. A leaf spring 40 is secured to the plunger 7 at the upper end of the recess 38 with its free end or tip engaging the back of the pawl or dog 39 to swing the tip or free end of the pawl into engagement with the ratchet wheel and to permit the dog or pawl to yield under certain conditions. It will be evident that when the plunger 7 is raised, the pawl or dog 39 will advance the ratchet wheel 27 one step or tooth, or will advance the dial 28 one step to expose the succeeding indication through the opening 29 in the front of the case. When the plunger 27 is depressed or lowered, the pawl or dog 39 will slide backwardly over the respective tooth of the ratchet wheel for a new operation, the ratchet wheel and dial being frictionally held when in a passive condition.

A suitable weight 41 is suspended from the lower end of the plunger 7, the said weight being sufficient to overbalance the tension of the valve 17 transmitted to the cord 22, in order that when the valve 17 is relieved of the grain thereon, the weight 41 will cause the plunger to gravitate, to thereby raise the valve 17. The weight 41 is merely sufficient to overbalance the valve 17, in order that when grain enters the pocket during the filling of the hopper, the weight of the grain on the valve 17 will depress the valve 17 against the tension created by the weight 41, whereby the plunger 7 is raised to advance the ratchet wheel and dial.

The plunger 7 is spaced slightly from the back panel or wall of the case 5, the bill 37 working between the back of the case and the plunger 7, and a screw or pin 42 engages through the plunger 7 directly above the recess 38 and protrudes from the rear face of the said plunger to coöperate with the bill 37 of the detent or locking plate 30. A second pin or screw 42′ is engaged through the plunger 7 directly below the recess 38, so as to project from the rear face of the plunger 7 to coöperate with the bill 37 when the detent or locking plate 30 is reversed, as will hereinafter appear.

In operation, supposing the case 5 to be attached to the outer face of one wall of the hopper 1, and supposing a spring 10 connecting the case and plunger 6 so as to tend to raise the said plunger, when the slide or valve 3 of the hopper is closed, the plunger 6 will be depressed, so as to swing the bill 37 of the detent or locking plate 30 out of the path of the pin or lug 42 of the plunger 7. When the hopper is empty, the weight 41 will depress the plunger 7, thereby raising the valve 17 within the pocket 12, so that when the hopper is filled with grain, or the like, the grain in entering the pocket 12 will settle upon the valve 17, and as the pocket becomes filled, the weight of the grain therein will depress the valve 17, and consequently, the plunger 7 will be raised. The plunger 7 in being raised will advance the dial 28 one step, the pawl or dog 39 being raised with the plunger 7 and engaging the ratchet wheel 27 so as to advance the dial as stated. Then, when the slide or valve 3 is opened, the cord 11 in being slackened will permit the plunger 6 to be raised through the tension of the spring 10, which will cause the tip of the bill 37 to swing under the pin or lug 42, the outer edge of the bill engaging the pin or lug 42 to lock the plunger 7 in raised position. Thus, while the slide or valve 3 is open, the plunger 7 will be locked or detained in raised position, in order to prevent the same from returning to normal or initial position before the hopper is empty, and before the slide or valve 3 is again closed. After the contents of the hopper has been discharged, the contents of the pocket 12 will also have been discharged, so as to release the valve 17, and when the slide or valve 3 is closed, the plunger 6 will be slid downwardly, so as to retract the bill 37 of the detent or locking plate 30 from under the pin or lug 42, which will permit the plunger 7 to gravitate under the tension of the weight 41, whereby the valve 17 is again raised. When the hopper is again filled, the valve 17 will be again depressed as above indicated so as to register the said draft of grain or other material. It will thus be observed that each charge of grain delivered into the hopper 1 will be registered by the dial 28, in order that a tally may be kept of the number of drafts drawn from the hopper, the device working automatically as the hopper is filled and emptied.

In some instances, it may be inconvenient to attach the registering or tally mechanism 4 to the hopper 1, as when the hopper is elevated above the floor, as illustrated in Fig. 8. In this case, the case 5 is preferably secured to the wall or support 44 at a convenient distance from the floor, and a cord 11$^b$ is attached at its ends to the upper end of the plunger 6, and to a lever 11$^a$ for actuating the slide or valve 3 of the hopper. A cord 22$^a$ is connected at one end to the upper end of the plunger 7 and its other end to the spool 20 of the shaft 16 journaled to the pocket 12 (not shown). The cord 22$^a$ or any of the other cords may be provided with suitable adjusting means 22$^b$ for regulating its length in order that the proper operation will ensue. With the device so positioned, the spring 10 is reversed, as indicated in Fig. 7, the terminals thereof being engaged with the respective pins or studs 8' and 9' in order to give a downward tension to the plunger 6, it being noted that when the lever 11$^a$ is swung to open the valve 3, the plunger 6 will be permitted to slide downwardly, while when the lever 11$^a$ is swung to close the valve 3, the plunger 6 will be raised against the tension of the spring 10 as positioned in Fig. 7. The detent or locking disk 30 is reversed, as seen in Fig. 7, in order that the bill 37 will coöperate with the lower pin or lug 42'. In this condition, the device will operate in a manner similar to the operation above described. Thus, when the valve 3 is closed, the cord 11$^b$ will slide the plunger 6 upwardly, and consequently, the tip of the bill 37 will be retracted out of the path of the pin or lug 42', as seen in Fig. 7, and when the hopper 1 is filled, the valve 17 in being depressed, will raise the plunger 7 so as to register the filling of the hopper. When the plunger 7 is raised, the pin or lug 42' will slide past the tip of the bill, 37, and when the valve 3 is opened, the cord 11$^b$ will be slackened, and the plunger 6 will be permitted to slide downwardly, which will cause the tip of the bill to engage under the pin or lug 42'. The inner edge of the bill 37 will thus engage under the pin or lug 42' to maintain the plunger 7 in its raised position, in order that the plunger may not descend or gravitate under the tension of the weight 41, until the hopper has been emptied, and until the valve 3 is closed. When the valve 3 is closed, the plunger 6 will be slid upwardly against the tension of the spring 10 so as to again retract the bill 37, which will permit the plunger 7 to slide downwardly, to raise the valve 17 for a new operation. It will thus be obvious that by reversing the spring 10, the detent or locking disk 30, and the attachment of the cord to the plunger 6, the device may be adapted for use in connection with various hoppers, the present device being attachable directly to the hopper, or being attachable to a support at a point spaced from the hopper.

As illustrated in Fig. 9, the parts of the registering or tally mechanism are disposed similar to that illustrated in Figs. 2 and 3, the cable 11$^b$ being trained around a pulley or guide 45 below the plunger 6, in order that the cable may be attached to the lower end of the said plunger, whereby the plunger will be depressed when the valve 3 of the hopper is closed. The operation of the register or tally 4 in the position indicated in Fig. 9 is similar to that first described.

Having thus described the invention, what is claimed as new is:—

1. The combination with a hopper having a discharge opening, and a closure for the opening, of a register mechanism, means for operating the mechanism when the hopper is filled, and means operatively connected to the closure for locking the said mechanism when the said closure is opened.

2. The combination with a hopper having a discharge opening, and a closure for the opening, of a register mechanism, movable means disposed within the hopper adapted to be actuated when the hopper is filled, and operably connected to the said mechanism for moving the same when the said means is actuated, and means controlled by the said closure for locking the said mechanism and means against retrograde movement when the closure is opened.

3. The combination with a hopper, of a register mechanism, a pocket secured within the hopper and having a lower discharge opening and a curved portion, a valve pivoted within the pocket having its free portion working along the said curved portion of the pocket to and from the said opening adapted to be depressed when the pocket is filled, during the filling of the hopper, and an operative connection between the said valve and mechanism whereby the mechanism is advanced when the valve is depressed.

4. The combination with a hopper having a discharge opening, and a closure for the opening, of a register mechanism including an indicator and actuating means therefor, movable means disposed within the hopper adapted to be actuated when the hopper is filled, and operatively connected to the aforesaid means for advancing the indicator when the second mentioned means is actuated, means for returning the said actuating means to normal position, and means controlled by the said closure for locking the said actuating means against returning to normal position, when the closure is opened.

5. The combination with a hopper having a valve, of a register mechanism including an actuating member, means disposed within the hopper adapted to be actuated when the hopper is filled and operably connected to the said actuating member for advancing the register mechanism when the said means is actuated, means for returning the actuating member to normal position, and a detent operably connected with the valve of the hopper and engageable with the said actuating member when the said valve is opened after the hopper has been filled.

6. The combination with a hopper having a discharge opening, and a valve for the opening, of a register mechanism including an actuating member, means disposed within the hopper adapted to be actuated when the hopper is filled and operably connected with the said actuating member for advancing the said register mechanism when the hopper is filled, spring pressed means operably connected to the said valve and engageable with the said actuating member to prevent the same from returning to normal position when the valve is opened after the hopper has been filled, and means for returning the said actuating member to normal position.

7. The combination with a hopper, and a closure therefor, of movable means disposed in the hopper adapted to be actuated when the hopper is filled, an indicator actuating ratchet wheel, a plunger operatively connected with the said means, a pawl carried by the plunger coöperating with the ratchet wheel, and a detent operatively connected to the closure and engageable with the plunger, when the same is advanced, to lock the same against returning to normal position.

8. The combination with a hopper, and a closure therefor, of movable means disposed in the hopper adapted to be actuated when said hopper is filled, and a register mechanism including a pair of plungers operatively connected to said closure and means, respectively, a dial actuating ratchet wheel, a pawl carried by that plunger connected to the said means and coöperating with the ratchet wheel, and a detent operatively connected to the other plunger and engageable with the aforesaid plunger when the last mentioned plunger is slid after the aforesaid plunger is advanced.

9. The combination with a hopper, and a closure therefor, of movable means disposed within the hopper adapted to be actuated when the hopper is filled, a register mechanism including a dial actuating ratchet wheel, a plunger, a pawl carried by the plunger and coöperating with the ratchet wheel, and a reversible detent engageable with the plunger to lock the same against retrograde movement after the same has been advanced, and designed to be actuated in opposite directions according to its adjustment, means for operatively connecting the plunger and the said movable means, and means for operatively connecting the reversible detent and the said closure.

10. The combination with a hopper having a discharge opening, and a valve for the said opening; of a register mechanism including a case, a pair of plungers slidable through the case, indicating means carried by the case and adapted to be advanced by one plunger when the same is slid in one direction, means for returning the said plunger to normal position, means for yieldingly moving the other plunger in one direction, and a detent carried by the case and operably connected to the last mentioned plunger, the detent being engageable with the last mentioned plunger when the same is advanced and when the last mentioned plunger is free; operable means disposed within the hopper adapted to be actuated when the hopper is filled, the last mentioned means being connected to the first mentioned plunger for advancing the same when the hopper is filled; and means operably connecting the last mentioned plunger and the valve for sliding the said plunger so as to swing the detent out of engagement with the first mentioned plunger, when the valve is closed.

In testimony that I claim the foregoing as my own, I have hereto affixed my signature in the presence of two witnesses.

JOSEPH E. FRIDGEN.

Witnesses:
ANTON LANGHAUSEN,
E. A. BURMESTER.

Copies of this patent may be obtained for five cents each, by addressing the "Commissioner of Patents, Washington, D. C."